United States Patent [19]

Farr et al.

[11] Patent Number: 5,180,514

[45] Date of Patent: * Jan. 19, 1993

[54] STABILIZING SYSTEM FOR LIQUID HYDROGEN PEROXIDE COMPOSITIONS

[75] Inventors: James P. Farr, Pleasanton; Daniel T. Carty, Danville, both of Calif.

[73] Assignee: The Clorox Company, Oakland, Calif.

[*] Notice: The portion of the term of this patent subsequent to Aug. 16, 2005 has been disclaimed.

[21] Appl. No.: 623,280

[22] Filed: Dec. 6, 1990

Related U.S. Application Data

[63] Continuation of Ser. No. 212,447, Jun. 28, 1988, abandoned, which is a continuation-in-part of Ser. No. 144,616, Jan. 11, 1988, Pat. No. 4,900,468, which is a continuation of Ser. No. 745,617, Jun. 17, 1985, abandoned.

[51] Int. Cl.$^5$ .................. C11D 3/26; C11D 3/36; C11D 3/395; C11D 7/38
[52] U.S. Cl. .................. 252/99; 8/109; 8/111; 252/95; 252/102; 252/186.25; 252/186.27; 252/186.28; 252/186.29; 252/400.2; 252/400.21; 252/401; 252/544; 252/545; 252/DIG. 11; 423/272; 423/584
[58] Field of Search .................. 423/272, 584; 252/186.25, 186.27, 186.28, 186.29, 400.2, 400.21, 401, 95, 102, DIG. 11, 544, 545, 99; 8/109, 111

[56] References Cited

U.S. PATENT DOCUMENTS

| 3,234,140 | 2/1966 | Irani | 252/186 |
|---|---|---|---|
| 3,415,608 | 12/1968 | Tucker | 8/10.2 |
| 3,591,341 | 7/1971 | Reilly | 23/207.5 |
| 3,607,053 | 9/1971 | Reilly | 23/207.5 |
| 3,649,194 | 3/1972 | Glanville | 23/207.5 |
| 3,655,559 | 4/1972 | Holt | 252/401 |
| 3,681,022 | 8/1972 | Kibbel | 23/207.5 |
| 3,726,800 | 4/1973 | Yelin et al. | 252/95 |
| 3,741,909 | 6/1973 | Yamane | 252/401 |
| 3,801,512 | 4/1974 | Solenberger | 252/186 |
| 3,822,114 | 7/1974 | Montgomery | 8/111 |
| 3,864,271 | 2/1975 | Stalter | 252/99 |
| 3,869,401 | 3/1975 | Ernst | 252/186 |
| 3,956,159 | 5/1976 | Jones | 252/104 |
| 3,970,575 | 7/1976 | Barrett, Jr. | 252/95 |
| 3,996,152 | 12/1976 | Edwards et al. | 252/186 |
| 4,013,404 | 3/1977 | Parent et al. | 8/423 |
| 4,022,703 | 5/1977 | Bakes et al. | 252/100 |
| 4,070,442 | 1/1978 | Watts | 423/272 |
| 4,079,015 | 3/1978 | Paucot et al. | 252/95 |
| 4,130,501 | 12/1978 | Lutz et al. | 252/95 |
| 4,133,869 | 1/1979 | Kim | 423/272 |
| 4,238,192 | 12/1980 | Kandathil | 8/111 |
| 4,239,643 | 12/1980 | Kowalski | 252/182 |
| 4,294,575 | 10/1981 | Kowalski | 8/111 |
| 4,304,762 | 12/1981 | Leigh | 423/272 |
| 4,320,102 | 3/1982 | Dalton, Jr. | 423/273 |
| 4,347,149 | 8/1982 | Smith et al. | 252/102 |
| 4,362,706 | 12/1982 | Willard | 423/273 |
| 4,430,236 | 2/1984 | Frank | 252/95 |
| 4,448,705 | 5/1984 | Gray | 252/102 |
| 4,470,919 | 9/1984 | Goffinet | 252/102 |
| 4,478,737 | 10/1984 | Adrian et al. | 252/186.25 |
| 4,497,725 | 2/1985 | Smith et al. | 8/111 |
| 4,510,068 | 4/1985 | Rohlfs et al. | 252/186.29 |
| 4,525,291 | 6/1985 | Smith et al. | 252/95 |
| 4,614,646 | 9/1986 | Christiansen | 252/186.29 |
| 4,623,356 | 11/1986 | Hendrix et al. | 8/111 |
| 4,764,302 | 8/1988 | Baker et al. | 252/102 |
| 4,829,115 | 5/1989 | Cottman | 252/401 |
| 4,853,143 | 8/1989 | Hardy et al. | 252/102 |
| 4,891,147 | 1/1990 | Gray et al. | 252/104 |
| 4,900,468 | 2/1990 | Mitchell | 252/95 |
| 4,912,247 | 3/1990 | Roling | 252/182.28 |

FOREIGN PATENT DOCUMENTS

| 0076166 | 6/1983 | European Pat. Off. . | |
|---|---|---|---|
| 0137669 | 4/1985 | European Pat. Off. . | |
| 0349153 | 1/1990 | European Pat. Off. . | |
| 3545909 | 6/1987 | Fed. Rep. of Germany | 252/186.29 |
| 2185797 | 8/1987 | Japan | 252/186.29 |
| 760315 | 10/1956 | United Kingdom . | |

OTHER PUBLICATIONS

Kirk-Othmer, *Encyclopedia of Chemical Technology* vol. 3, pp. 128–148, John Wiley & Sons, 1979.
Encyclopedia of Chemical Technology, Kirk-Othmer, Third Edition, vol. 13, "Hydrogen-Ion Activity to Laminated Materials, Glass", pp. 14–15.
Atlas Chemical Industries, Inc., Products Brochure, pp. 1–4.

*Primary Examiner*—A. Lionel Clingman
*Assistant Examiner*—Linda D. Skaling
*Attorney, Agent, or Firm*—John A. Bucher

[57] ABSTRACT

Aqueous peroxide bleaching compositions including organic components such as surfactants, fluorescent whiteners and dyes are effectively stabilized by the addition of a stabilizing system comprising stabilizing effective amounts of a heavy metal chelating or sequestering agent and an aromatic amine free radical scavenging agent. Both agents must be present to achieve maximum stability. The aromatic amine free radical scavenging agent is preferably a primary or secondary aryl amine having at least one hydrogen on the nitrogen of the amine. The stabilizing system stabilizes the organic component as well as the peroxide oxidizing agent.

22 Claims, No Drawings

STABILIZING SYSTEM FOR LIQUID HYDROGEN PEROXIDE COMPOSITIONS

This is a continuation of application Ser. No. 212,447, filed Jun. 28, 1988, now abandoned. Application Ser. No. 07/212,447 filed Jun. 28, 1988, now abandoned, is a continuation-in-part of application Ser. No. 07/144,616 filed Jan. 11, 1988 now U.S. Pat. No. 4,900,468 which in turn was a continuation of abandoned application Ser. No. 06/745,617 filed Jun. 17, 1985, all under common assignment to The Clorox Company. Accordingly, the parent application is incorporated herein as though set forth in its entirety to facilitate disclosure of the present invention.

FIELD OF THE INVENTION

This invention relates to household fabric bleaching compositions, more particularly liquid peroxide, e.g., hydrogen peroxide based bleaching compositions including additional adjuncts such as surface active agents, fluorescent whiteners and dyes. The bleaching compositions have the peroxide and certain adjuncts therein stabilized by the addition of agents to chelate heavy metal cations and scavenge free radicals.

BACKGROUND OF THE INVENTION

Liquid bleaches have long been used in households as aids in the bleaching and cleaning of fabrics. Hypochlorite bleaches have been used most extensively for this purpose since they are highly effective, inexpensive and simple to produce.

In an attempt to broaden and extend the utility of bleaches for household use, other bleach systems have been introduced in recent years. Prominent among these are dry powdered or granular compositions, most usually based upon peroxy- compositions or perboro- compositions. Such materials must be placed into aqueous solution to release the active bleaching agents.

Liquid bleaching compositions including peroxy compounds have generally been utilized less in the household market than the solid forms referred to above. Although hydrogen peroxide compositions effectively bleach a broad range of fabric materials, are less harsh than hypochlorite bleaches and do not release objectional gases or odors, they have not found as much use in the household market as hypochlorite bleaches. This lack of use in the household market has been partially attributable to the instability of peroxide solutions. Instability is mediated principally by metal ion contamination even in extremely low concentrations. Considerable effort has been expended in the search for stabilizing agents for hydrogen peroxide compositions.

Perhaps one reason why stabilized hydrogen peroxide compositions have not been successful is the fact that it is very desirable to add other organic components to commercial bleaching compositions, especially where the compositions are intended to be used as "pre-spotters". Such "pre-spotter" compositions most advantageously include surfactants for their detergent effect, fluorescent whiteners (also known as optical brighteners) to increase fabric reflectance and the user's perception of increased whiteness, and dyes for producing a pleasing color to the bleach solutions. All of the above components, in addition to the bleach compounds themselves, have been found to be necessary in a liquid peroxygen bleaching composition to achieve full acceptance in the household market.

Unfortunately, liquid bleaching compositions based upon peroxide not only deteriorate from the presence of contaminants, e.g., trace metal cations (0.5ppm or greater); in addition, the surfactant, fluorescent whiteners and dyes are attacked by the peroxide itself, as it is a powerful oxidizing agent. Thus, peroxide based bleaching compositions including surfactants, fluorescent whiteners and dyes deteriorate quite rapidly. The surfactants are oxidized and lose their detergency; the fluorescent whiteners are oxidized and lose their effect; and the dyes are oxidized and lose their color or are changed to undesirable colors.

SUMMARY OF THE INVENTION

The present invention is directed to methods for stabilizing liquid hydrogen peroxide based compositions, and more especially to stabilizing liquid peroxide bleaching compositions that also include surfactants, fluorescent whiteners and dyes. The invention is also directed to compositions produced by such methods.

More particularly, the present invention relates to liquid hydrogen proxide bleaching compositions (including the aforementioned additional components) that are stabilized by the addition thereto of a metal chelating agent as well as a free radical scavenging agent. The presence of both the chelating agent and free radical scavenging agent are necessary to achieve the desired stability.

The metal chelating or sequestering agent may be selected from among known metal chelating agents. A preferred group of such chelating agents are the aminopolyphosphonates which are known to sequester metal ions such as $Fe^{+++}$ and $Cu^{++}$, as set forth in the parent referred to above.

The free radical scavenging agent may be selected from organic antioxidants, especially the substituted mono- and di-hydroxybenzenes and their analogs, also as set forth in the parent referred to above.

Stabilization of hydrogen peroxide compositions including the associated fluorescent whiteners (also known as optical brighteners), surfactant and dye components relies upon the presence of both the metal and chelating agent and the free radical scavenging agent. The stabilizing agents need only be present in very small amounts, e.g., tenths to hundredths of a percent by weight of the liquid composition, in order to effectively prevent deterioration and retention of the desired strengths of the various components over extended periods of time.

As utilized herein, "stabilization" refers to the retention of physical and chemical properties at or somewhat below their initial levels by each of the liquid bleach composition components for extended periods of time; a significant reduction in the rate of deterioration of such components in comparison to unstabilized formulations. Thus, in the presence of the stabilizing agents, the peroxide component retains most of its initial oxidation potential; the surfactant component retains most of its detergency; the fluorescent whitener retains most of its ability to impart improved appearance to fabrics; and the dye component is prevented from completely oxidizing.

The parent referred to above provided a method for stabilizing components in a liquid peroxide bleaching composition, including a peroxide oxidant, a surfactant, a fluorescent whitener and a dye by including therein small amounts of a metal chelating or sequestering agent, such as an aminopolyphosphonate, and a free radical scavenging agent, such as a substituted hydroxybenzene.

It has been discovered, in accordance with the present invention that an effective stabilizing system for a liquid peroxide bleaching composition may also include a metal chelating or sequestering agent, such as an aminopolyphosphonate, and an aromatic amine free radical scavenging agent.

Accordingly, it is an object of the invention to provide a stabilizing system and method for stabilizing a liquid peroxide bleaching composition by incorporating therein a stabilizing system comprising stabilizing effective amounts of a chelating or sequestering agent and an aromatic amine free radical scavenging agent.

It is a related object of the invention to provide a stabilizing system and method for stabilizing a peroxide containing composition including organic components susceptible to decomposition by incorporating therein a stabilizing system comprising stabilizing effective amounts of a chelating or sequestering agent and an aromatic amine free radical scavenging agent.

The aromatic amine free radical scavenging agent is preferably selected as having (1) a hydrogen atom attached to the nitrogen in the amine substituent and available for attack by a free radical, and (2) an aromatic ring attached to the same nitrogen for stabilizing the radical formed on the nitrogen by removal of a proton. An example of the reaction sequence between an aromatic amine free radical scavenging agent and a free radical, for example in a peroxide containing composition or bleach, is described in greater detail below.

In accordance with the two features set forth above, the aromatic amine free radical scavenging agent is more preferably a primary or secondary aromatic amine in order to have at least one hydrogen atom available on the nitrogen of the amine substituent. Commercially available amine antioxidants are generally secondary aryl amines as also described in greater detail below.

The aromatic amine free radical scavenging agent contemplated by the present invention may also be a fused ring amine of a type described in greater detail below.

One or more hydrogens on an aromatic ring or rings in the aromatic amine free radical scavenging agent can be substituted by a functional group, preferably a hydroxyl group tending to act as an antioxidant itself for achieving increased antioxidizing power in the aromatic amine free radical scavenging agent. Substitution can also be accomplished by means of another aryl ring or an alkyl group containing one or more carbon atoms in order to achieve additional advantages as also described in greater detail below.

Similar substitution, preferably by an alkyl group, may also be provided for one of two hydrogens attached to a nitrogen in an amine substituent of primary aromatic amine. In this instance, the alkyl group could be substituted for hydrogen atoms in two different primary aromatic amine free radical scavenging agents as also described in greater detail below.

Other objects and advantages of the invention will become apparent from a review of the following specification and the claims appended hereto.

DETAILED DESCRIPTION OF THE INVENTION

Liquid hydrogen peroxide based household bleaching compositions are stabilized by the addition of small amounts of a two component system, i.e., a metal chelating or sequestering agent and a free radical scavenging agent.

The liquid bleach compositions comprise a hydrogen peroxide bleaching component, with the addition of at least one surfactant, fluorescent whiteners, dye, a fragrance if desired, and suitable amounts of an acid or base to maintain the final solution pH in the range of 1-8, more preferably about 1-6, and most preferably about 2-4. Small amounts of the stabilizing agents and, of course, water complete the bleach compositions.

The peroxide component may be fairly dilute. In one preferred embodiment hydrogen peroxide is present at about 3.5% by weight. The surfactant is present at levels of about 3-4% by weight. The whiteners are present at levels of about 0.15-0.6% by weight. The dye may comprise about 0.0002-0.001% by weight of the composition. Small amounts of fragrance oil e.g., about 0.005-0.1% by weight may also be present. The stabilizing agents may comprise about 0.05-0.2% by weight in the case of the chelating agent, and about 0.005-0.05% by weight in the case of the free radical scavenging agent.

Sufficient pH adjusting agent is added to maintain the product pH at about 1-6, preferably about 2-4. Water usually comprises the remaining percentage of the solution and should be deionized to reduce metal ion contaminants to as low a level as possible. It should be noted, however, that even if metal ion contamination reaches levels of 2-10 ppm or more, the stabilizing system of the invention is still effective.

As will be noted hereinafter, the stabilizing agents appear to have a synergistic effect upon the stability of the bleach compositions. Both the chelating agent and the aromatic amine free radical scavenger of the invention must be present in order to fully stabilize the compositions.

The reason for the stabilization effect is not fully understood. However, without wishing to be bound thereby, it is theorized that, in the presence of hydrogen peroxide, organic compounds such as nonionic surfactants, e.g., ethoxylated alcohols, and fluorescent whiteners, e.g., stilbenes and distyrylbiphenyls, a reaction occurs with the peroxide and/or its decomposition species to produce free radicals. Once the free radicals are produced, they are able to react further with the organic components to continually degrade the composition.

More specifically, in aqueous solution, free radical reactions can be initiated with peroxides which act to abstract a hydrogen ion from, for instance, one of the ethylene groups present on the nonionic surfactant molecules. Such a reaction might be as follows:

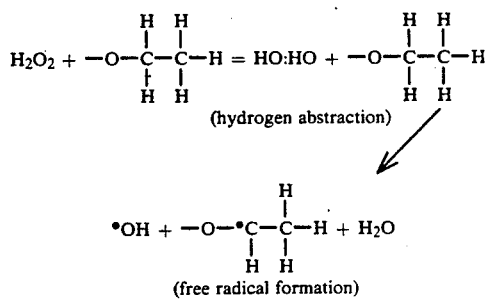

Alternately, the hydrogen peroxide itself may form free radicals by homolytic cleavage of either an O—H bond or the O—O bond. That is:

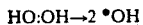

In any event, there are a number of mechanisms by which free radicals can occur in the peroxide-organic composition. By a little understood mechanism, it appears that the presence of heavy metal cations also promotes the generation of free radicals. Such free radical reactions are self propagating and become a chain reaction until a termination product is produced. By such time, in the absence of any stabilization means, both the peroxide and the organic components are, in large measure, destroyed.

Once formed, any such free radicals are free to combine with other organic species in the solution, e.g., the optical brighteners and dye. Such free radicals would be especially reactive with compounds having conjugated double bonds, e.g., dyes and brighteners.

In the stabilizing system of the invention, the chelating agent appears to act to sequester the heavy metal cations, especially polyvalent metals such as copper and iron, which are always present in small amounts among the mineral components in water. Thus, the heavy metal cations' ability to catalyse peroxide homolysis is interfered with. Similarly, the heavy metals' ability to mediate free radical generation is eliminated or greatly reduced.

The free radical scavenging agent appears to work by tying up any free radicals initially formed in the solution. Thus, the ability of the free radicals to degrade the organic components is removed at the same time the self-propagating free radical cascade reactions are stopped short. By such a mechanism, destruction of the desired surfactant, optical whitener, dye, and perfume components is arrested or greatly reduced.

It should be understood that the foregoing is presented as a possible explanation for the surprising stability imparted to peroxide bleaching compositions; but the inventors do not thereby intend to be bound for such explanation. Other plausible reactions may be responsible for the improvement in stability.

Yet the individual functions of the chelating agent and the free radical scavenger do not explain why such surprising improved stability is achieved by the present invention. When the two component stabilizing system is used in liquid peroxide bleach compositions, decomposition of the organic components therein is dramatically decreased, even over the stabilizing abilities of the chelating agent and the free radical scavenger considered individually. Therefore, the combination of the chelating agent and the free radical scavenger appears to possess synergistic action in improving stability of liquid peroxide compositions containing organic components.

Referring to the stabilized peroxide compositions of the invention, a peroxide source is present as the principal active ingredient and functions as the bleaching agent. The peroxide is normally present as hydrogen peroxide and is present in the range of about 0.05-50 weight %, more preferably about 0.1-35 wt.%, and most preferably about 0.5-15 wt.%. Hydrogen peroxide is a staple article of commerce available from a number of commercial sources. In making up the bleaching compositions, the peroxide is ordinarily purchased as a concentrated aqueous solution, e.g., 70%, and diluted with deionized water to the desired strength. The FMC Corp. of Philadelphia, Pa. is one source of hydrogen peroxide.

Surfactants are desirable for use in the bleaching compositions. Not only do they perform the normal soil removing function; but, in the present formulations, they also assist in emulsifying the free radical scavenger into the aqueous bleach formulation. As will be noted hereinafter, the free radical scavenger component is somewhat hydrophobic. The surfactants therefore assist mixing of free radical scavenger into the bleach compositions.

As will also be noted hereinafter, the surfactant component can provide a thickening effect, especially when used in higher concentrations such as when exceeding about 5 wt.%.

The most preferred surfactants are nonionics. Suitable nonionics include polyethoxylated alcohols, ethoxylated alky phenols, polyoxyethylene or polyoxypropylene block co-polymers, anhydrosorbitol esters, alkoxylated anhydrosorbitol esters, and the like. Other potentially suitable surfactants are disclosed in the *Kirk-Othmer Encyclopedia of Chemical Technology*, 3rd Edition, Volume 22, pp. 360-377 (1983), the disclosure of which is incorporated herein by reference. Such nonionic surfactants may be obtained from any number of commercial sources. One such source for polyethoxylated alcohols is the Shell Chemical Co. of Houston, Tex. and are known under the tradename "Neodol". One suitable surfactant is "Neodol 25-7", an ethoxylated alcohol wherein the alcohol has from 12-15 carbons to which 7 ethoxy groups are attached. Anhydrosorbitol esters (including sorbitan esters) are available from Atlas Chemical Industries under the tradenames "Tween" and "Arlacel".

The surfactant may be present in the compositions in about 3-4 weight %, although this level is not critical. Lower or higher surfactant concentrations are acceptable within the ranges noted The preferred range for surfactant is 0-50 wt.%; the more preferred range is 0-20 wt.%; and the most preferred range is 0-10 wt.%. At higher levels, and as noted above, the surfactants may beneficially have a thickening effect on the liquid compositions. Such thickening may aid in the dispersion of particulate components such as dyes and whiteners. Also, as noted above, the surfactants may also assist in emulsifying the liquid compositions and aid in the suspension of some of the free radical scavengers since they tend to be somewhat insoluble in aqueous medium. Mixtures of the surfactants are also suitable.

Fluorescent whiteners (also referred to as optical brighteners, or FWA's) are also included in the bleaching formulations. Such whiteners are also common commercial products. Such products are fluorescent materials, very often substituted stilbenes and biphenyls, having the ability to fluoresce by absorbing ultraviolet wavelengths of light and then emitting visible light, generally in the blue wavelength ranges. The whiteners settle out or deposit onto the fabrics during the bleaching or washing process to impart the desired whiteness. The whiteners may be present in the bleaching compositions in the order of several hundredths to about 5 wt.%, more preferably about 0-1 wt.%, and most preferably about 0-0.6 wt.%. One source of such whiteners is the Ciba Geigy Corp. of Greensboro, N.C., under the tradename "Tinopal". Other useful whiteners are disclosed in U.S. Pat. No. 3,393,153 to Zimmerer et al, at columns 3-5, which disclosure is incorporated herein by reference.

Several different whiteners may be combined in the compositions. Such selection is governed by the fact that certain whiteners have affinity for cellulose fibers, e.g., cotton while others have affinity for synthetic fibers, e.g., nylon. Since the bleaching compositions of the invention are intended for all types of fabrics, both natural and synthetic, it is advantageous to include whiteners of both types. One stilbene based product, "Tinopal RBS" has affinity for synthetic fibers. A distyrylbiphenyl product "Tinopal CBS-X" has affinity for cellulose fibers.

Small amounts of dye are also included in the preferred bleaching compositions. While the dye is only a very small percentage (perhaps 0.0005 wt.%) of the compositions, it plays an important part in the consumer's acceptance of the product. It is preferred that such dye be present in the range of about 0-1 wt.%, more preferably about 0-0.1 wt.%, and most preferably about 0-0.001 wt.%. Dyes such as the anthraquinones are particularly suitable. Such anthraquinone dyes are available from the Sandoz Co. of Charlotte, N.C. One suitable dye is "Nylosan ZAL" from the aforementioned company. Other dyes of the desired color with resistance to bleaching can also be used. In some instances, inorganic pigments may be used. Preferred pigments are those which have the metallic cations substantially or completely complexed, e.g., copper phthalocyanines.

A fragrance may also be used in the bleaching formulations, if desired. Any fragrance oil may be used, ordinarily in small quantities, e.g., 0.01%, so long as it is as stable as the other components. The preferred range is about 0-5 wt.%. The more preferred range is about 0-1 wt.%; while the most preferred range is about 0-0.1 wt.%.

In addition to the aforementioned components, a pH adjusting agent is added to the composition in order to adjust the final pH into the 1-8 range, more preferably about 1-6, and most preferably about 2-4. Phosphoric and sulfuric acid are preferred for this purpose when acidic pH is desired. Other mineral acids such as nitric acid could also be used as well as organic water soluble acids such as acetic acid, citric acid, etc. and hydrochloric acid. On the other hand, appropriate amounts of a base could be used if necessary or desirable to raise the pH of the composition.

As noted above, the stabilizing system is vital to the bleaching compositions. Both the chelating agent and the free radical scavenger must be present. Tests have shown that neither agent is as effective individually as when present in combination. Synergistic forces are obviously involved in the stabilization and prolonged stability of the bleaching compositions results only when both agents are present.

The chelating agent may be selected from any number of known agents with the caveat that any agent selected must be effective in chelating heavy metal cations, such as $Cu^{++}$ and $Fe^{+++}$. The chelating agent should also be resistant to hydrolysis; and not easily oxidized by hydrogen peroxide. Perferably, it should have an acid dissociation constant, i.e., pKa of about 1-9, indicating that it dissociates at low pH levels to permit bonding to the metal cations.

In this regard, the amino polyphosphonates have been found to be most useful in the present bleaching compositions. The amino polyphosphonates are commercially available compounds sold, for example, under the trademark "Dequest" by the Monsanto Co. of St. Louis, Miss. These compounds have structures such as:

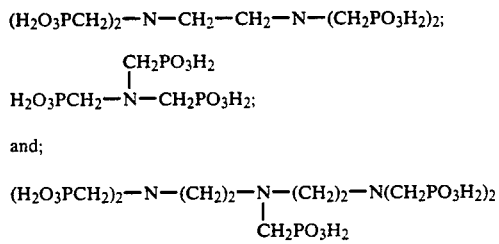

Such "Dequest" compounds are extremely effective as chelating agents in the bleach compositions. Other related chelating agents such as the pyrophosphates may also be utilized.

The selected chelating agent should be present in the compositions in an amount sufficient to thoroughly tie up any heavy metal cations present in the aqueous solution. One or two tenths of a percent is sufficient. The chelating agent may be present in the range of about 0.02-5 wt.%. A more preferred range is about 0.04-0.3 wt.%. The most preferred range is about 0.06-0.12 wt.%.

The second vital stabilizing agent is the aromatic amine free radical scavenger referred to above. As indicated above, the aromatic amine free radical scavenging agent is characterized by two key features. Initially, at least one hydrogen atom is attached to the nitrogen in the amine substituent of the aromatic amine to be available for attack by a free radical. Secondly, an aromatic ring is attached to the same nitrogen in order to stabilize a radical formed on the nitrogen by removal of a proton resulting from the free radical attack. An example of the reaction sequence between an aromatic amine, as contemplated by the present invention, and a free radical is illustrated below:

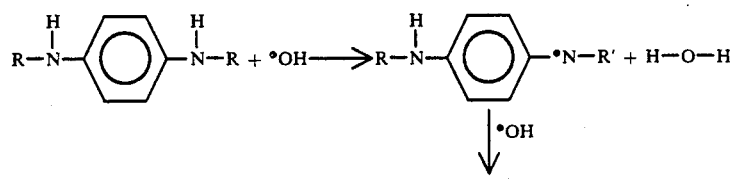

-continued

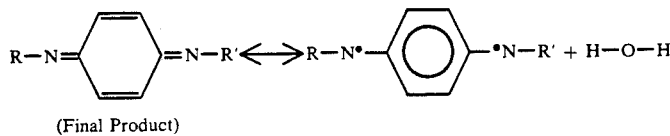

(Final Product)

The overall reaction for the above sequence is illustrated below:

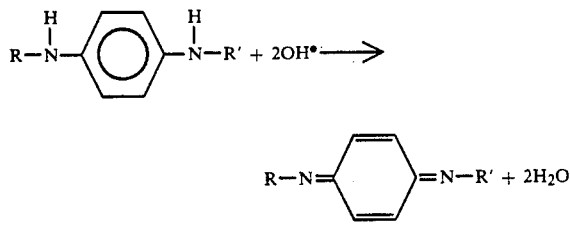

In accordance with the requirement that at least one hydrogen atom be attached to the nitrogen in the amine substituent of the aromatic amine, the aromatic amine is preferably a primary or secondary amine. A number of commercially available substituted secondary aryl amines are illustrated in Table I below.

One or more hydrogens on an aromatic ring or rings in the aromatic amine free radical scavenging agent may be substituted by a functional group, preferably a hydroxyl group acting as an antioxidant itself for increased antioxidizing power in the aromatic amine. Substitution may also involve another aryl ring or an alkyl group containing one or more carbon atoms. For example, a number of substituted diaryl amines are included in Table I below.

Substitution, preferably by an alkyl group, may also take place for a hydrogen atom on the nitrogen of an amine substituent in a primary aromatic amine (in order to retain at least one hydrogen atom on the nitrogen in accordance with the requirements set forth above). Furthermore, substitution by an alkyl group could also occur for hydrogen atoms on two different primary aryl amines to result in a product having the structure set forth below:

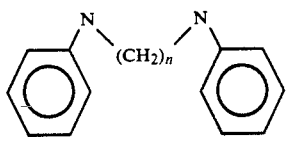

As was also noted above, the aromatic amine of the present invention could comprise a fused ring structure resulting in a product such as a naphthyl amine. Other fused ring aromatic amines in accordance with the present invention could include anthracene and phenanthrene, for example.

In accordance with the preceding discussion, a number of commercially available aromatic amine antioxidants are set forth below in Table I.

TABLE I

| Class | R | R' | Trade Name | Supplier |
|---|---|---|---|---|
| substituted diarylamines |  |  | Wingstay 29 | Goodyear |
| 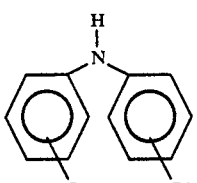 | $C_8H_{17}$ | $C_8H_{17}$ | Antioxidants | Akron Chem |
| | $C_8H_{17}$ | $C_8H_{17}$ | Octamine | Uniroyal |
| | $C_8H_{17}$ | $C_8H_{17}$ | Flectol ODP | Monsanto |
| | $C_8H_{17}$ | $C_8H_{17}$ | Vukanox OCD | Mobay |
| | $C_9H_{19}$ | $C_9H_{19}$ | Polylite | Uniroyal |
| | $C_8H_{17}$ | H | Polylite | Uniroyal |
| | | | Anox NSM | Bozzetto Industrie Chem |
| p-phenylenediamines 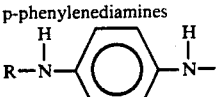 |  |  | Agertie HP-S | RTV |
| Substituted dihydorquinolines (1) polymerized 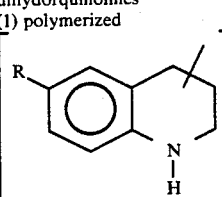 | — | — | Pennox HR | Pennwalt |
| | — | — | Cyanox 12 | Cyanamid |
| | — | — | Flectol H | Monsanto |

TABLE I-continued

| Class | R | R' | Trade Name | Supplier |
|---|---|---|---|---|
| (2) unpolymerized | $C_{12}H_{25}$ | — | Santoflex AN | Monsanto |
|  | $C_2H_5O—$ | — | Santoflex AN | Monsanto |
| -naphthylamines |  |  | Vulkanox | Mobay |
|  |  |  | Naugard PANA | Uniroyal |

The free radical scavenging agent must generally resist oxidation by a peroxide such as hydrogen peroxide and, therefore, cannot be an overly strong reducing agent which would more likely react with the peroxide itself.

Generally, all of the products summarized below and set forth in Table I meet the above requirements.

Only very small amounts of the free radical scavenger are necessary in the bleach compositions. Generally, one to several hundredths of a percent provides effective free radical scavenging. The preferred range is about 0.005–0.1 wt.%. A more preferred range is about 0.007–0.04 wt.%; however, the most preferred range is about 0.01–0.02 wt.%.

As a general example, a typical stabilized bleach formulation is set forth below:

PREFERRED STABILIZED BLEACHING FORMULATIONS

| Component | Wt. % |
|---|---|
| Nonionic surfactant (Neodol) | 2–4 |
| Fluorescent whitener - distyrylbiphenyl | 0.1–0.7 |
| - stilbene | 0.01–0.3 |
| Blue dye - anthroquinone | 0.0002–0.001 |
| Fragrance | 0.01–0.05 |
| $H_2O_2$ | 3–7 |
| Aminopolyphosphonate chelating agent | 0.06–0.25 |
| Free radical scavenger | 0.005–0.02 |
| Phosphoric acid | sufficient to adjust pH to 2.3 |
| $H_2O$ - deionized | remainder |

A number of more specific examples of stabilized bleaching systems made and tested according to the present invention each have the formulation set forth immediately below (Formulation A) with respective stabilizing systems indicated in Table II.

| FORMULATION A | |
|---|---|
| Ingredient | Wt. % |
| $H_2O_2$ | 3.5 |
| Brightener[1] | 0.16 |
| Dye[2] | 0.0005 |
| Surfactant[3] | 3.5 |
| Fragrance | 0.01 |
| Free Radical Scavenger[4] | 0.01 |
| Chelating Agent[5] | 0.12 |
| pH Adjusting Agent ($H_3PO_4$) | 0.1 |

| -continued | |
|---|---|
| FORMULATION A | |
| Ingredient | Wt. % |
| Water | Balance |

[1]Fluorescent Whitening Agent, a distyryl biphenyl compound. e.g., Tinopal CBS-X, from Ciba - Geigy, Inc.
[2]Anthraquinone dye, Acid Blue 25, from Sandoz Company.
[3]Surfactant was Neodol 25-7, a $C_{12-15}$ linear ethoxylated alcohol with about 7 moles of ethylene oxide per mole or alcohol.
[4]See below.
[5]See below.

TABLE II

| EXAMPLE | CHELATING AGENT | WT. % | FREE RADICAL SCAVENGER | WT. % |
|---|---|---|---|---|
| 1. | 0 | 0 | 0 | 0 |
| 2. | Dequest 2010[1] | 0.12 | 0 | 0 |
| 3. | Dequest 2060[2] | 0.12 | 0 | 0 |
| 4. | Dequest 2041[3] | 0.12 | 0 | 0 |
| 5. | 0 | 0 | Anox NSM[4] | 0.01 |
| 6. | 0 | 0 | Santoflex AW[5] | 0.01 |
| 7. | 0 | 0 | Naphthylamine[6] | 0.01 |
| 8. | Dequest 2010 | 0.12 | Anox NSM | 0.01 |
| 9. | Dequest 2010 | 0.12 | Santoflex AW | 0.01 |
| 10. | Dequest 2010 | 0.12 | Naphthylamine | 0.01 |
| 11. | Dequest 2060 | 0.12 | Anox NSM | 0.01 |
| 12. | Dequest 2060 | 0.12 | Santoflex AW | 0.01 |
| 13. | Dequest 2060 | 0.12 | Naphthylamine | 0.01 |
| 14. | Dequest 2041 | 0.12 | Anox NSM | 0.01 |
| 15. | Dequest 2041 | 0.12 | Santoflex AW | 0.01 |

TABLE II-continued

| EXAMPLE | CHELATING AGENT | WT. % | FREE RADICAL SCAVENGER | WT. % |
|---|---|---|---|---|
| 16. | Dequest 2041 | 0.12 | Naphthylamine | 0.01 |

Footnotes to Table II
[1]Dequest 2010 (60% active) available from Monsanto Co., has the structure

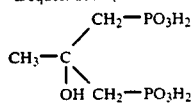

[2]Dequest 2060 (50% active) available from Monsanto Co., has the structure

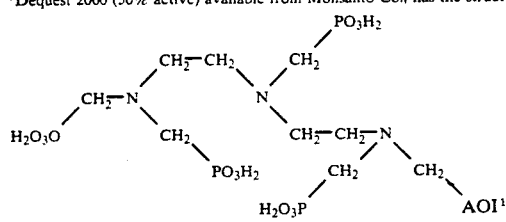

[3]Dequest 2041 (90% active) available from Monsanto Co., has the structure

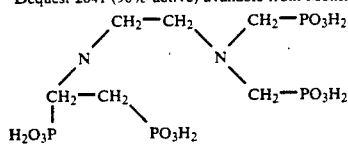

[4]Anox NSM (Pennox A, etc.) (100 active), available from Bozzetto Industrie Chemiche, is an alkylated diphenyl amine with the structure

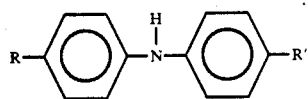

[5]Santoflex AW (100% active), available from Monsanto, Co., is a dihydroquinoline with the structure

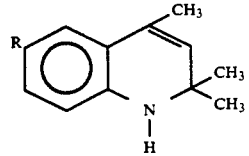

[6]Naphthylamine (98% active) available from Aldrich Chemical Co., is an N-phenyl-alpha naphthylamine with the structure

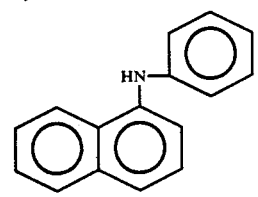

To assess the stabilizing effect of the added chelating agents and free radical scavengers in each of Examples 1-16, the samples were initially measured for available oxygen (via Iodometric titration) and amounts of dye (without dilution) and brightener (dilution factor: 3 mils. formulation/1,000 mls. water). Amounts of dye and brightener were measured as absorbance units via a Beckman Spectrophotometer set at wavelengths 598 nm and 344 nm, respectively.

Each sample was then innoculated with 6 ppm heavy metal ions (3 ppm Fe (III); 3 ppm Cu (II)) and stored at 100° C. for three hours. The available oxygen for the hydrogen peroxide and the absorbance values for the dye and the brightener were then read again. (Note: Storage at 100° C. for three hours approximates long term storage of about 5 months at room temperature.)

The data observed were collected and tabulated in TABLE III below:

TABLE III

| EXAMPLE | $PO_3H_2$ | $AO_F$ | % AO | $DYE_I$[2] | $DYE_F$ | % DYE | $FWAI$[3] | $FWA_F$ | % FWA |
|---|---|---|---|---|---|---|---|---|---|
| 1. | 17920 | 10080 | 56 | 0.171 | 0 | 0 | 0.443 | 0 | 0 |
| 2. | 17920 | 16160 | 90 | 0.172 | 0 | 0 | 0.437 | 0.1 | 23 |
| 3. | 17280 | 15680 | 91 | 0.168 | 0 | 0 | 0.441 | 0.12 | 27 |
| 4. | 15840 | 12640 | 80 | 0.18 | 0 | 0 | 0.477 | 0 | 0 |
| 5. | 18080 | 13280 | 73 | 0.199 | 0 | 0 | 0.466 | 0 | 0 |
| 6. | 17600 | 12000 | 68 | 0.21 | 0 | 0 | 0.466 | 0 | 0 |
| 7. | 17920 | 17280 | 96 | 0.172 | 0 | 0 | 0.475 | 0.311 | 65 |
| 8. | 17360 | 16960 | 98 | 0.166 | 0.16 | 96 | 0.468 | 0.444 | 95 |
| 9. | 17360 | 17280 | 100 | 0.207 | 0 | 0 | 0.473 | 0.344 | 73 |
| 10. | 17440 | 17440 | 100 | 0.17 | 0.195 | 115 | 0.483 | 0.454 | 94 |
| 11. | 17120 | 16800 | 98 | 0.216 | 0.155 | 72 | 0.461 | 0.382 | 83 |
| 12. | 17360 | 16960 | 98 | 0.208 | 0 | 0 | 0.465 | 0.36 | 77 |
| 13. | 17600 | 17120 | 97 | 0.181 | 0.167 | 92 | 0.48 | 0.436 | 91 |
| 14. | 17440 | 16480 | 94 | 0.209 | 0 | 0 | 0.483 | 0.296 | 61 |
| 15. | 17280 | 15680 | 91 | 0.207 | 0 | 0 | 0.483 | 0.133 | 28 |
| 16. | 17600 | 16720 | 95 | 0.183 | 0 | 0 | 0.491 | 0.397 | 81 |

[1]AOI = Initial reading of available oxygen; $AO_F$ = Final reading.
[2]DYEI = Initial reading of dye; $DYE_F$ = Final reading.
[3]FWAI = Initial reading of brightener; $FWA_F$ = Final reading.

The above results in TABLE III show that surprising and dramatically improved stability synergistically resulted when the inventive stabilizing system of a free radical scavenger and a metal chelating agent was used.

Example 1, which used neither chelating agent nor free radical scavenger, had no stabilizing effect on dyes or brighteners.

Examples 2-4, containing only metal chelating agents, have no stabilizing effect on dyes and minimal to no effect on brighteners.

Examples 5-7, containing only aromatic amine free radical scavengers, have no stabilizing effect on dyes and minimal to no effect on brighteners.

Examples 8-10, on the other hand, in which both metal chelating agent and aromatic amine free radical scavenger, show dramatic improvement in stability. Occasionally, some Examples (9, 12, 14-16) show lack of stabilizing effect on dyes, but overall, increased stability above and beyond that of any Examples 1, 2-4 and 5-7, is demonstrated. The data therefore demonstrates synergistic action of the free radical scavenger and the metal chelating agent to stabilize dyes and brighteners in a very hostile environment—high temperature (boiling point of water) and large concentration of heavy metals.

Other aromatic amines, in addition to those included in Examples 5-16, may also be employed according to the present invention to achieve similar synergistic results. For example, such other aromatic amines could include all variations defined in TABLE I and summarized elsewhere above.

In addition, other formulations, besides that set forth above as FORMULATION A, could be employed. For further example, but not to limit the scope of the invention, additional stabilized bleaching systems according to the invention could have either of the formulations set forth below (FORMULATIONS B and C) while being tested in a similar manner as described above.

| FORMULATION B | |
|---|---|
| Component: | Wt. % |
| Hydrogen Peroxide | 4.0 |
| Whitener (Distyrylbiphenyl) | 0.3 |
| Acid Blue Dye | 0.001 |
| Surfactant (Triton X-100) | 4.0 |
| Chelating Agent (Aminopolyphosphonate) | 0.18 |
| pH Adjustment (Sulfuric Acid) | 0.035 |
| Free Radical Scavenging Agent | 0.01 |
| Water | Balance |

| FORMULATION C | |
|---|---|
| Component: | Wt. % |
| Hydrogen Peroxide | 3.0 |
| Whitener (Phorwite CNA) | 0.3 |
| Acid Blue Dye | 0.001 |
| Surfactant (Neodol 25-9) | 3.0 |
| Chelating Agent (Aminopolyphosphonate) | 0.2 |
| pH Adjustment (Sulfuric Acid) | 0.035 |
| Free Radical Scavenging Agent | 0.01 |
| Water | Balance |

Note: Phorwite CNA may be characterized as: 4,4'bis(4-phenyl-2H-1,2,3-trazol-2-yl)-2,2'stilbenedisulfonic acid.

Accordingly, a variety of aromatic amine free radical scavenging agents have been disclosed for inclusion within a stabilizing system also containing a chelating or sequestering agent for use in stabilizing liquid peroxide compositions and more preferably liquid bleach compositions containing hydrogen peroxide. Numerous variations for the present invention, in addition to those specifically set forth, will be apparent to those skilled in the art. Accordingly, the scope of the present invention is defined only by the following appended claims.

What is claimed is:

1. A colored liquid peroxide bleaching composition, stabilizing against a loss of activity of a dye or a fluorescent whitening agent, comprising an aqueous composition comprising 0.05-50 wt.% of a peroxygen component, an organic component comprising 0-50 wt. % of the compositions as surfactants, several hundredths to about 5 wt. % of the composition as fluorescent whitening agent, 0.0002-1 wt. % of the composition as a dye, and mixtures thereof, and a stabilizing system comprising (a) a phosphonate or an aminopolyphosphonate as a chelating agent comprising about 0.02-5 wt. % of the composition and an aromatic amine free radical scavenging agent selected from the group consisting of substituted diarylamines, p-phenylenediamines, substituted dihydroquinolines, naphthylamines, and mixtures thereof in an amount effective to provide effective free radical scavenging.

2. The composition of claim 1 wherein said peroxygen component is hydrogen peroxide.

3. The composition of claim 2 further including a fragrance.

4. The composition of claim 1 wherein said nonionic surfactant is selected from the group consisting of polyethoxylated alcohol, ethoxylated alkyl phenols, polyoxypropylene or polyoxyethylene block copolymers, and mixtures thereof.

5. The composition of claim 1 wherein said chelating agent is capable of forming chelates with polyvalent heavy metal cations.

6. The composition of claim 1 wherein the aromatic amine free radical scavenging agent has at least one hydrogen on a nitrogen.

7. The composition of claim 1 wherein the aromatic amine is a primary or secondary aromatic amine.

8. The composition of claim 7 wherein one or more hydrogens on an aromatic ring are substituted by an alkyl group having at least one carbon atom or another aryl group.

9. The composition of claim 7 wherein one or more hydrogens on an aromatic ring are substituted by a hydroxyl group.

10. The composition of claim 1 wherein the aromatic amine is a secondary aromatic amine.

11. The composition of claim 1 wherein the aromatic amine comprises a primary aromatic amine.

12. The composition of claim 1 wherein the aromatic amine comprises fused multiple aromatic rings.

13. A method for stabilizing colored aqueous hydrogen peroxide formulations comprising 0.05-50 wt. % of a peroxygen component, an organic component comprising 0-50 wt. % of the composition as surfactants, several hundredths to about 5 wt. % of the composition as fluorescent whitening agent, 0.0002-1 wt. % of the composition as a dye, and mixtures thereof against loss of activity of a dye or fluorescent whitening agent, the method comprising admixing into the formulation a phosphonate or an aminopolyphosphonate as a chelating agent comprising about 0.02-5 wt. % of the formulation and an aromatic amine free radical scavenging agent selected from the group consisting of substituted dihydroquinolines, naphthylamines, and mixtures thereof in an amount effective to provide effective free radical scavenging.

14. The method of claim 13 wherein the chelating agent is selected for forming chelates with polyvalent heavy metal cations.

15. The method of claim 13 wherein the aromatic amine free radical scavenging agent has at least one hydrogen on a nitrogen.

16. The method of claim 15 wherein one or more hydrogens on an aromatic ring are substituted by an alkyl group having at least one carbon atom or another aryl group.

17. The method of claim 15 wherein the aromatic amine is a primary or secondary aromatic amine.

18. The method of claim 15 wherein the aromatic amine comprises fused multiple aromatic rings.

19. An improved stabilizing system for a colored peroxide containing liquid composition including an organic component comprising 0-50 wt. % of the composition as surfactants, several hundredths to about 5 wt. % of the composition as fluorescent whitening agent, 0.0002-1 wt. % of the composition as a dye, and mixtures thereof, the stabilizing system comprising a phosphonate or aminopolyphosphonate as a chelating agent comprising about 0.02-5 wt. % of the composition and an aromatic amine free radical scavenging agent selected from the group consisting of substituted dihydroquinolines, naphthylamines, and mixtures thereof in an amount effective to provide effective free radical scavenging.

20. The improved stabilizing system of claim 19 wherein the aromatic amine free radical scavenging agent has at least one hydrogen on a nitrogen.

21. The improved stabilizing system of claim 20 wherein the aromatic amine is a primary or secondary aromatic amine.

22. The improved stabilizing system of claim 20 wherein the aromatic amine comprises fused multiple aromatic rings.

* * * * *